(12) United States Patent
Angaluri et al.

(10) Patent No.: US 9,910,679 B2
(45) Date of Patent: Mar. 6, 2018

(54) SELECTIVE LOADING OF COMPONENTS WITHIN A NODE TO SPEED UP MAINTENANCE ACTIONS

(71) Applicant: Lenovo Enterprise Solutions (Singapore) Pte. Ltd., Singapore (SG)

(72) Inventors: Srihari V. Angaluri, Raleigh, NC (US); Gary D. Cudak, Wake Forest, NC (US); James S. Worley, Raleigh, NC (US); Chulho Kim, Poughkeepsie, NY (US); Ajay Dholakia, Cary, NC (US); Sumeet Kochar, Cary, NC (US); Gregory B. Pruett, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 166 days.

(21) Appl. No.: 14/884,351

(22) Filed: Oct. 15, 2015

(65) Prior Publication Data

US 2017/0109175 A1 Apr. 20, 2017

(51) Int. Cl.
| | | |
|---|---|---|
| *G06F 11/00* | (2006.01) | |
| *G06F 9/44* | (2018.01) | |
| *G06F 11/267* | (2006.01) | |
| *G06F 9/445* | (2018.01) | |
| *G06F 11/14* | (2006.01) | |

(52) U.S. Cl.
CPC ........ *G06F 9/4416* (2013.01); *G06F 9/44505* (2013.01); *G06F 11/142* (2013.01); *G06F 11/1417* (2013.01); *G06F 11/267* (2013.01); *G06F 2201/84* (2013.01)

(58) Field of Classification Search
CPC ...... G06F 9/4401; G06F 9/4408; G06F 9/441; G06F 9/44505; G06F 11/079; G06F 11/1417; G06F 11/142; G06F 11/2247; G06F 11/2273; G06F 11/267; G06F 15/177

See application file for complete search history.

(56) References Cited

U.S. PATENT DOCUMENTS

| | | | | |
|---|---|---|---|---|
| 6,353,885 | B1 * | 3/2002 | Herzi .................... | G06F 9/4411 713/1 |
| 6,671,802 | B1 * | 12/2003 | Ott ...................... | G06F 9/44505 713/100 |
| 9,128,729 | B1 * | 9/2015 | Hung .................... | G06F 9/4403 |
| 2004/0015629 | A1 * | 1/2004 | Inui ..................... | G06F 13/4081 710/300 |

(Continued)

*Primary Examiner* — Gabriel Chu
(74) *Attorney, Agent, or Firm* — Jeffrey L. Streets

(57) ABSTRACT

A method includes identifying a subset of components of a node that should be loaded during the next boot of the node, storing a list of the identified subset of components in a file outside of a basic input output system, and initiating boot of the node. The method further comprises the basic input output system accessing the file and controlling boot of the node to load only the identified subset of components of the node. Another method stores a plurality of such files, wherein each file is associated with maintenance of a target component of the node. After selecting one of the files, the basic input output system may access the selected file and control boot of the node to load only the subset of components that the selected file indicates should be loaded for purposes of a maintaining or testing the target component.

15 Claims, 2 Drawing Sheets

(56) References Cited

U.S. PATENT DOCUMENTS

| | | | |
|---|---|---|---|
| 2007/0208928 A1* | 9/2007 | Rios | G06F 9/4401 |
| | | | 713/1 |
| 2008/0104386 A1* | 5/2008 | Van Rooyen | G06F 9/4401 |
| | | | 713/2 |
| 2008/0301422 A1* | 12/2008 | Johnson | G06F 11/2284 |
| | | | 713/1 |
| 2009/0113198 A1* | 4/2009 | Liu | H04L 41/0803 |
| | | | 713/2 |
| 2009/0132799 A1* | 5/2009 | Brumley | G06F 9/44505 |
| | | | 713/100 |
| 2009/0210689 A1* | 8/2009 | Harmer | G06F 9/4401 |
| | | | 713/2 |
| 2011/0161646 A1* | 6/2011 | Yu | G06F 9/4401 |
| | | | 713/2 |
| 2011/0225274 A1* | 9/2011 | Dvorkin | G06F 9/44505 |
| | | | 709/222 |
| 2012/0272049 A1* | 10/2012 | Chang | G06F 3/0488 |
| | | | 713/2 |
| 2013/0086571 A1* | 4/2013 | Dasari | G06F 8/665 |
| | | | 717/168 |
| 2013/0198504 A1* | 8/2013 | Arnold | G06F 9/44 |
| | | | 713/2 |
| 2015/0186161 A1* | 7/2015 | Cho | G06F 9/44505 |
| | | | 713/2 |

* cited by examiner

SELECTIVE LOADING OF COMPONENTS WITHIN A NODE TO SPEED UP MAINTENANCE ACTIONS

BACKGROUND

Field of the Invention

The present invention relates to methods for loading devices during the startup of a node, such as a server.

Background of the Related Art

A basic input output system (BIOS) or a unified extensible firmware interface (UEFI) provides firmware that is used during the process of booting a computer. The BIOS code initializes and tests system hardware components and loads a boot loader program or operating system from a data storage device. As firmware, the BIOS is difficult to modify and the computer will boot in the same configuration until the BIOS is updated.

A computer with a complex configuration, including a large variety of component types and features, can require a considerable amount of time to boot. This is true even if the computer is being rebooted simply to load an additional diagnostic tool in an operating system, or to perform simple checks of health and inventory. For example, a single full configuration boot of an eight (8) socket high-end computer system with max capacity DIMM may require as much as 20 minutes according to chipset vendor published times. Furthermore, an I/O card can spend up to one minute per port looking for devices out on a storage area network (SAN), even though such devices may or may not exist and may be part of the problem itself where the SAN adapter itself is in question.

BRIEF SUMMARY

One embodiment of the present invention provides a method, comprising identifying a subset of components of a node that should be loaded during the next boot of the node, storing a list of the identified subset of components in a file outside of a basic input output system, and initiating boot of the node. The method further comprises the basic input output system accessing the file and controlling boot of the node to load only the identified subset of components of the node.

Another embodiment of the present invention provides a method, comprising storing a plurality of files outside of a basic input output system, wherein each file is associated with maintenance of a component of a node, and wherein each file identifies a subset of components of the node that should be loaded during the next boot of the node. The method further comprises selecting one of the files, initiating boot of the node, and the basic input output system accessing the selected file and controlling boot of the node to load only the subset of components that the selected file indicates should be loaded.

A further embodiment of the present invention provides a computer program product comprising program instructions embodied on a non-transitory computer readable storage medium, where the program instructions are executable by a processor to cause the processor to perform any of the methods disclosed herein. One method comprises identifying a subset of components of a node that should be loaded during the next boot of the node, storing a list of the identified subset of components in a file outside of a basic input output system, and initiating boot of the node. The method further comprises the basic input output system accessing the file and controlling boot of the node to load only the identified subset of components of the node. Another method comprises storing a plurality of files outside of a basic input output system, wherein each file is associated with maintenance of a component of a node, and wherein each file identifies a subset of components of the node that should be loaded during the next boot of the node, selecting one of the files, initiating boot of the node, and the basic input output system accessing the selected file and controlling boot of the node to load only the subset of components that the selected file indicates should be loaded.

DETAILED DESCRIPTION

Figure 1:
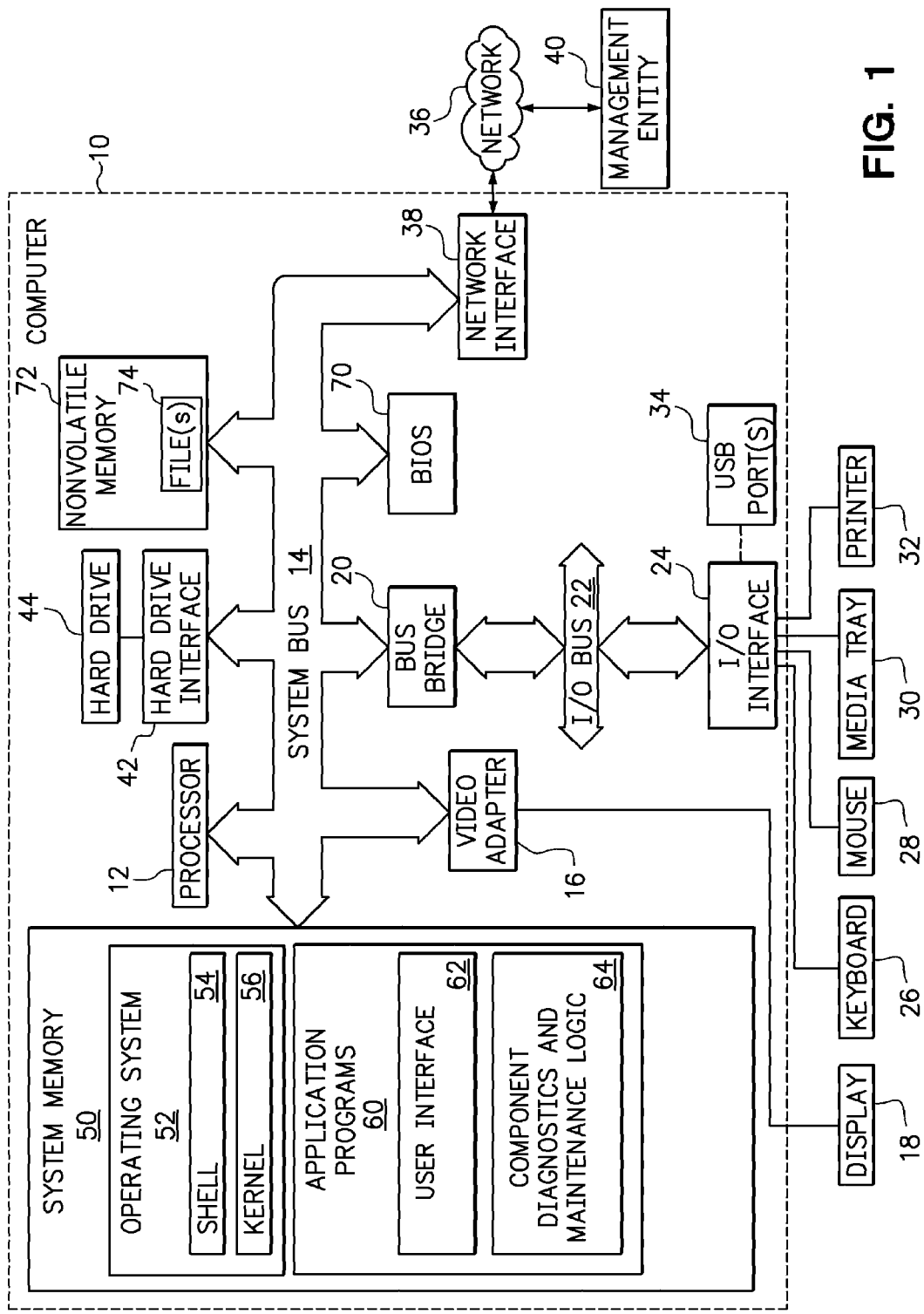
FIG. 1 is a diagram of a computer according to one embodiment of the present invention.

One embodiment of the present invention provides a method, comprising identifying a subset of components of a node that should be loaded during the next boot of the node, storing a list of the identified subset of components in a file outside of a basic input output system, and initiating boot of the node. The method further comprises the basic input output system accessing the file and controlling boot of the node to load only the identified subset of components of the node.

The node may, without limitation, be a personal computer, laptop computer, server, or network switch. The components of the node may, without limitation, include a processor, volatile memory, non-volatile memory, a data storage device, a network adapter, a RAID (redundant array of independent disks) adapter, and various peripherals. The file may follow any format, such as a text based descriptor file. Optionally, a text based descriptor file may be written in hypertext markup language (HTML), extensible markup language (XML), or comma separated values (CSV). In a further option, the file may be edited using an application running on the node or on a management entity in communication with the basic input output system. The file may be stored in memory of a management entity in communication with the basic input output system, or in nonvolatile memory of the node. The system BIOS may locate the descriptor file using a predefined address for the file that may be stored in the BIOS.

The file may identify any one or more component of the node that should be loaded during the next boot of the node. In one non-limiting example, the file is a descriptor file written in an HTML format as follows:

<deviceload>
HDD1=yes
RAID1=yes
Network2=no
</deviceload>

Alternatively, the file may be a simple bitmap that identifies the components that should and should not be loaded when booting the system in a maintenance mode. For example, a bit map may use the following:

Bit 0—reduced memory is ok for this boot
Bit 1—reduced CPU resources ok for this boot
Bit 2—reduced PCI adapters ok for this boot.

Booting the node in a reduced configuration may greatly reduce down time and service time.

Identifying a subset of components of a node that should be loaded during the next boot of the node, may include identifying one or more of the components to be enabled, identifying one or more of the components that should not be enabled (i.e., disabled), or both. In one option, a user may identify the subset of components through a user interface, such as an application program generating a graphical user interface or an input device on a front panel of the node. One front panel input device may be referred to as lightpath diagnostics. The lightpath diagnostics includes a front-panel display that provides information about errors and device status, but may, in the present example, be used to select which devices should be enabled or disabled. In this manner, an individual device may be assigned to a defined state, such as being enabled or disabled, or a group of devices may be collectively assigned to various defined states in accordance with predetermined maintenance modes. Optionally, the BIOS/UEFI may store one or more predetermined maintenance modes, where each mode identifies a defined state for each of a group of devices. Selecting one of the predetermined maintenance modes via the lightpath diagnostics panel may implement defined states for any number of devices.

The method may further comprise identifying an order in which each of the identified components are to be loaded during boot, and storing the order in the file. The order may be identified in a manner to optimize testing or maintenance of a component, or to reduce the amount of time necessary to boot the node. Furthermore, the boot order of the components may be a function of any dependencies between components. For example, the method may include identifying a dependency between two or more of the identified components, and storing the dependency in the file. A dependency may indicate, for example, that Component A and Component B are to be loaded together, or that Component C and Component D should be loaded before Component E is loaded.

In another example, the method may include identifying a date of a most recent firmware code update for each component of the node, and automatically modifying the file to indicate that components with outdated firmware should not be loaded during the next boot of the node or to change the order in which the components are loaded as a function of the identified date of the most recent firmware code update for each component.

In a preferred embodiment, the method may further comprise testing a target component from among the identified components, wherein the subset of components includes only those components that are involved in testing the target component. For example, if the component that is the target of a test is a network adapter, it is not necessary to load all of the memory or a data storage device. In another example, a memory test may enable a processor and the memory to be tested, but disable a network adapter.

Furthermore, the method may allow a user to select between a manual mode and an automatic mode for modifying the file to identify components that should be loaded during the next boot. In a manual mode, the user may select each component to be loaded, select each component that should not be loaded, or edit a list of components that should be loaded or not loaded. In the automatic mode, the file is automatically modified to identify the components that should be loaded. In one example, the method includes detecting a fault associated with a component of the node, and automatically modifying the file to identify the components that should be loaded to enable testing of the component associated with the fault. In another example, the method includes detecting that an individual component of the node that has outdated firmware, and automatically modifying the file to indicate that the individual component should not be loaded during the next boot of the node.

Various embodiments of the present invention may provide the benefit that the basic input output system loads the subset of components in less time than required to load all of the components of the node.

Another embodiment of the present invention provides a method, comprising storing a plurality of files outside of a basic input output system, wherein each file is associated with maintenance of a component of a node, and wherein each file identifies a subset of components of the node that should be loaded during the next boot of the node. The method further comprises selecting one of the files, initiating boot of the node, and the basic input output system accessing the selected file and controlling boot of the node to load only the subset of components that the selected file indicates should be loaded. In one option, the method may further include receiving a user selection of an automated maintenance mode, and, in response to a fault event associated with an individual component of the node and a user selection of the automated maintenance mode, automatically selecting the file that is associated with maintenance of the individual component associated with the fault event, wherein the node will boot in a reduced configuration that disables components that are not needed to troubleshoot the fault event.

A further embodiment of the present invention provides a computer program product comprising program instructions embodied on a non-transitory computer readable storage medium, where the program instructions are executable by a processor to cause the processor to perform any of the methods disclosed herein. One method comprises identifying a subset of components of a node that should be loaded during the next boot of the node, storing a list of the identified subset of components in a file outside of a basic input output system, initiating boot of the node, and the basic input output system accessing the file and controlling boot of the node to load only the identified subset of components of the node. Another method comprises storing a plurality of files outside of a basic input output system, wherein each file is associated with maintenance of a component of a node, and wherein each file identifies a subset of components of the node that should be loaded during the next boot of the node, selecting one of the files, initiating boot of the node, and the basic input output system accessing the selected file and controlling boot of the node to load only the subset of components that the selected file indicates should be loaded.

The foregoing computer program products may further include computer readable program code for implementing or initiating any one or more aspects of the methods described herein. Accordingly, a separate description of the methods will not be duplicated in the context of a computer program product.

FIG. 1 is a diagram of a computer or server 10 that is capable of implementing the methods of the present invention. The computer 10 includes a processor unit 12 that is coupled to a system bus 14. The processor unit 12 may utilize one or more processors, each of which has one or more processor cores. A video adapter 16, which drives/supports a display 18, is also coupled to the system bus 14. The system bus 14 is coupled via a bus bridge 20 to an input/output (I/O) bus 22. An I/O interface 24 is coupled to the I/O bus 22 provides communication with various I/O devices, including a keyboard 26, a mouse 28, a media tray 30 (which may include storage devices such as CD-ROM drives, multi-media interfaces, etc.), a printer 32, and USB port(s) 34. As shown, the computer 10 is able to communicate with other network devices, such as a management entity 40, via the network 36 using a network adapter or network interface controller 38.

A hard drive interface 232 is also coupled to the system bus 206. The hard drive interface 42 interfaces with a hard drive 44. In a preferred embodiment, the hard drive 44 communicates with system memory 50, which is also coupled to the system bus 14. System memory includes the lowest level of volatile memory in the computer 200. This volatile memory may include additional higher levels of volatile memory (not shown), including, but not limited to, cache memory, registers and buffers. Data that populates the system memory 50 includes the operating system (OS) 52 and application programs 60.

The operating system 52 includes a shell 54 for providing transparent user access to resources such as application programs 60. Generally, the shell 54 is a program that provides an interpreter and an interface between the user and the operating system. More specifically, the shell 54 executes commands that are entered into a command line user interface or from a file. Thus, the shell 54, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 56) for processing. Note that while the shell 54 is a text-based, line-oriented user interface, the present invention will equally well support other user interface modes, such as graphical, voice, gestural, etc.

As depicted, the operating system 52 also includes the kernel 56, which includes lower levels of functionality for the operating system 52, including providing essential services required by other parts of the operating system 52 and application programs 60, including memory management, process and task management, disk management, and mouse and keyboard management. The application programs 60 in the system memory of the computer 10 may include, without limitation, a user interface module 62 allowing a user to identify components of the node that should be loaded during the next boot of the node module 62, and a component diagnostics and maintenance logic module 64. Alternatively, the user interface module 62 and the component diagnostics and maintenance logic module 64 may be implemented within the operating system 52.

The computer 10 also include a basic input output system (BIOS) module 70 that includes non-volatile memory storing BIOS logic that is used when the computer is booted. Accordingly, the BIOS is responsible for loading firmware drivers for various components of the computer 10. In accordance with embodiment of the present invention, the BIOS 70 may also access non-volatile memory 72 that stores one or more files 74 that identify those components of the computer that should be loaded during the next boot of the computer 10. Alternatively, the files 74 may be stored on the same nonvolatile memory as the BIOS 70, stored by the management entity 40, or stored on a USB-flash drive coupled to the USB port 34.

The hardware elements depicted in the computer 10 are not intended to be exhaustive, but rather are representative. For instance, the computer 10 may include alternate memory storage devices such as magnetic cassettes, digital versatile disks (DVDs), Bernoulli cartridges, and the like. These and other variations are intended to be within the scope of the present invention.

Figure 2:
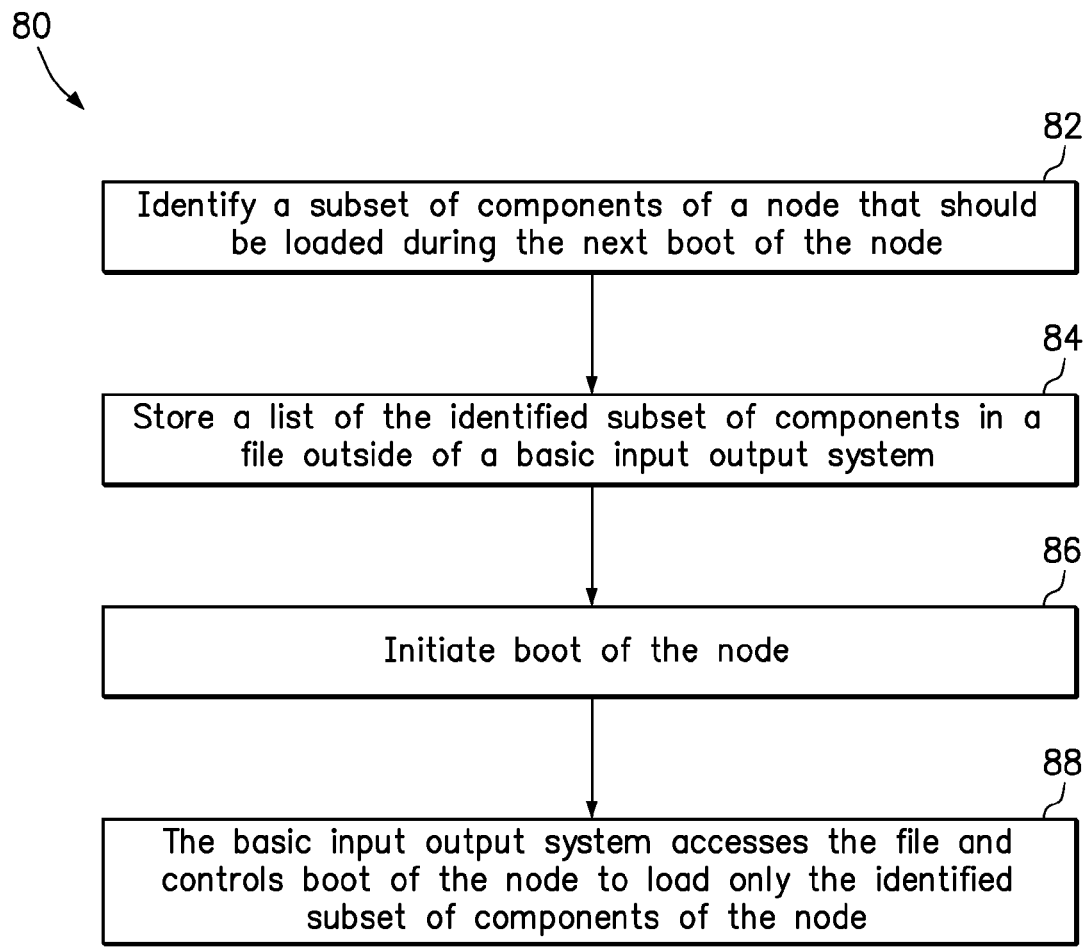
FIG. 2 is a flowchart of a method according to another embodiment of the present invention.

FIG. 2 is a flowchart of a method 80 according to one embodiment of the present invention. In step 82, the method includes identifying a subset of components of a node that should be loaded during the next boot of the node. In step 84, the method stores a list of the identified subset of components in a file outside of a basic input output system. Step 86 includes initiating boot of the node. In step 88, the basic input output system accesses the file and controls boot of the node to load only the identified subset of components of the node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
identifying a subset of components of a node that should be loaded during the next boot of the node, wherein the subset of components includes a target component and only those components that are involved in testing the target component;
storing a list of the identified subset of components in a file outside of a basic input output system;
initiating boot of the node;
the basic input output system accessing the file and controlling boot of the node to load only the identified subset of components of the node; and
testing the target component.

2. The method of claim 1, wherein identifying a subset of components of a node that should be loaded during the next boot of the node, includes identifying one or more of the components of the node to be enabled and identifying one or more of the components of the node that should not be enabled.

3. The method of claim 1, further comprising:
identifying an order in which each of the identified components are to be loaded during boot; and
storing the order in the file.

4. The method of claim 1, wherein identifying a subset of components of a node includes receiving a selection of components from a user interface of the node.

5. The method of claim 1, wherein the basic input output system loads the subset of components in less time than required to load all of the components of the node.

6. The method of claim 1, wherein the node is a server.

7. The method of claim 1, wherein the file is a text based descriptor file.

8. The method of claim 7, wherein the text based descriptor file is written in hypertext markup language (HTML), extensible markup language (XML), or comma separated values (CSV).

9. The method of claim 1, wherein the file is stored in memory of a management entity in communication with the basic input output system.

10. The method of claim 1, further comprising:
editing the file using an application running on a management entity in communication with the basic input output system.

11. The method of claim 1, wherein the subset of components are selected from a network adapter, RAID adapter, and memory DIMMs.

12. The method of claim 1, further comprising:
identifying a dependency between two or more of the identified components; and
storing the dependency in the file.

13. The method of claim 1, wherein identifying a subset of components of a node that should be loaded during the next boot of the node, includes using an input device on a front panel of the node.

14. A method comprising:
detecting that an individual component of a node has outdated firmware;
identifying a subset of components of the node that should be loaded during the next boot of the node;
storing a list of the identified subset of components in a file outside of a basic input output system, wherein the file indicates that the individual component having outdated firmware should not be loaded during the next boot of the node;
initiating boot of the node; and
the basic input output system accessing the file and controlling boot of the node to load only the identified subset of components of the node.

15. A method comprising:
identifying a date of a most recent firmware code update for each component of a node; and
identifying a subset of components of a node that should be loaded during the next boot of the node;
storing a list of the identified subset of components in a file outside of a basic input output system, wherein the file indicates an order in which the components are loaded as a function of the identified date of the most recent firmware code update for each component;
initiating boot of the node; and
the basic input output system accessing the file and controlling boot of the node to load only the identified subset of components of the node.

* * * * *